(12) United States Patent
Frey et al.

(10) Patent No.: US 11,269,788 B2
(45) Date of Patent: Mar. 8, 2022

(54) MANAGING MEMORY IN AN ELECTRONIC DEVICE

(71) Applicant: NXP B. V., Eindhoven (NL)

(72) Inventors: Alexandre Frey, Hamburg (DE); Ralf Malzahn, Seevetal (DE); Frank Ernst Johannes Siedel, Winsen/Luhe-Stoeckte (DE); Shameer Puthalan, Bangalore (IN); Andreas Lessiak, Graz (AT); Daniel Kershaw, Modling (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/996,448

(22) Filed: Aug. 18, 2020

(65) Prior Publication Data
US 2021/0081335 A1 Mar. 18, 2021

(30) Foreign Application Priority Data

Sep. 12, 2019 (EP) .................... 19290089

(51) Int. Cl.
G06F 12/02 (2006.01)
G06F 12/14 (2006.01)
G06F 12/0873 (2016.01)
G06F 21/79 (2013.01)

(52) U.S. Cl.
CPC ...... *G06F 12/1483* (2013.01); *G06F 12/0238* (2013.01); *G06F 12/0873* (2013.01); *G06F 21/79* (2013.01); *G06F 2212/7201* (2013.01)

(58) Field of Classification Search
CPC ............. G06F 12/1483; G06F 12/0292; G06F 12/0238; G06F 21/79; G06F 12/0873; G06F 12/145; G06F 2212/7201; G06F 21/552; G06F 2221/2141; G06F 21/53; G06F 12/02; G06F 12/14; Y02D 10/00
See application file for complete search history.

(56) References Cited

U.S. PATENT DOCUMENTS

| 8,572,329 | B2 | 10/2013 | Axford et al. |
| 8,943,251 | B2 | 1/2015 | Schoenfeldt et al. |
| 2007/0277009 | A1 | 11/2007 | Anschel et al. |
| 2010/0049939 | A1 | 2/2010 | Porat et al. |

(Continued)

FOREIGN PATENT DOCUMENTS

WO 2009/088920 A1 7/2009

OTHER PUBLICATIONS

M. Milenkovic, "Microprocessor memory management units," in IEEE Micro, vol. 10, No. 2, pp. 70-85, Apr. 1990.*

*Primary Examiner* — Pierre Miche Bataille

(57) ABSTRACT

There is described a method of managing memory in an electronic device, the method comprising creating a set of equally sized logical regions in a logical address space, each logical region comprising a plurality of consecutive logical addresses, and mapping a subset of consecutive logical addresses within each logical region to a set of physical addresses within a corresponding physical memory region, the subset of consecutive logical addresses comprising the first logical address within the logical region, said first logical address being mapped to a base address within the corresponding physical memory region. Furthermore, there is described a controller for managing memory in an electronic device and a method of determining a physical memory address in a physical memory region using such a controller.

15 Claims, 2 Drawing Sheets

(56) References Cited

U.S. PATENT DOCUMENTS

| | | |
|---|---|---|
| 2014/0108701 A1 | 4/2014 | Liljeberg |
| 2014/0181239 A1* | 6/2014 | Gaonkar .................. G06F 3/061 709/216 |
| 2015/0248355 A1* | 9/2015 | Levenglick .......... G06F 12/1491 711/163 |
| 2016/0283396 A1 | 9/2016 | Ter-Grigoryan et al. |
| 2016/0364342 A1 | 12/2016 | Piel et al. |
| 2016/0371195 A1* | 12/2016 | Kim .................... G06F 12/0653 |
| 2018/0004677 A1* | 1/2018 | Kim .................... G06F 12/0246 |
| 2018/0173645 A1 | 6/2018 | Parker et al. |
| 2018/0203637 A1* | 7/2018 | Furuya ................. G06F 3/0641 |
| 2019/0012099 A1* | 1/2019 | Mulani ................ G06F 3/0619 |
| 2019/0034347 A1* | 1/2019 | Haswell .............. G06F 12/1027 |
| 2020/0065241 A1* | 2/2020 | Cho .................... G11C 11/4082 |

* cited by examiner

MANAGING MEMORY IN AN ELECTRONIC DEVICE

CROSS-REFERENCE TO RELATED APPLICATIONS

This application claims priority under 35 U.S.C. § 119 to European Patent Application No. 19290089.2, filed on Sep. 12, 2019, the contents of which are incorporated by reference herein.

FIELD OF THE INVENTION

The present invention relates to the field of memory management, in particular to a method of managing memory in an electronic device, such as a smart card with a secure element. The present invention further relates to a controller for managing memory in an electronic device and to a method of determining a physical address in a physical memory region using such a controller.

ART BACKGROUND

A "Secure Element" is a tiny security device using Smart-Card like tamper-resistant countermeasures. It typically embeds an operating system (OS) which provides a rich and open execution environment with sophisticated management options, like installation and management in the field of applications and cryptographic keys under the control of multiple actors.

Secure Elements are used for increasingly many applications in many markets: mobile payment, transport ticketing, phone low-level security functions, mobile network authentication (eUICC), passports, IoT, car access, etc.

All these markets and applications have vastly different security requirements and certification processes and are related to different ecosystems. It is therefore increasingly difficult to host all these applications in a single operating system while making all the actors satisfied.

One possible solution to this problem would be to use multiple independent discrete devices. However, this multiplies the cost and footprint for the customer.

Another possible solution is to integrate multiple independent OS's in a single device. This requires an underlying "virtualization" system composed of hardware and software collaborating to prevent interference between the OS's, while allowing sharing and virtualization of the device resources.

Virtualization systems are well known in the context of large computing devices like PCs. However, the hardware architectures to support virtualization in this context is not adapted to the limited resources of a Smart-Card device:

- The memory is typically split in relatively big pages (4 KB or 8 KB), which creates internal fragmentation. This is not a problem for systems with megabytes or gigabytes of memory, but would be a problem for a device with a few tens of kilobytes of RAM
- The hardware allows remapping on any virtual page to any physical page, but this requires relatively big page tables. For example, on an ARM Cortex-A processor, the minimum size of a page table is 1 KB and there must be one such table per virtualized OS, which again would be a huge consumption of resources in a Smart-Card device On the other hand, recent embedded processors, like ARM's Cortex M processors with TrustZone also provide some level of virtualization for embedded applications. However, the virtualization of the memory system is primitive:

- No virtual address space, which does not allow to build sandboxes for applications and limits the ability to update persistent code and data of multiple components
- Only a limited number of memory regions can be defined (for example only up to 16 regions with 32-byte alignment, at a significant hardware cost)
- As a result, the default Cortex M TrustZone system is too limited to implement a full virtualization system of multiple OS's, at least not without a lot of re-configuration and memory copies during the context switches.

There may thus be a need for a way of managing memory in an electronic device, in particular in a smart card or secure element, without the drawbacks and limitations described above. In particular, there may be a need for a way of virtualizing the memory among the OS's in a device with very limited RAM resources like a Smart Card in order to achieve at least the following advantages:

- Fast context-switches between the OS's and among permission contexts within each OS
- Flexible allocation of memory to each OS, allowing independent in-the-field updates of each OS or a part of it
- Support for multi-OS virtualisation by partitioning, and restricting access to the on-chip memory resources

SUMMARY OF THE INVENTION

This need may be met by the subject matter according to the independent claims. Advantageous embodiments of the present invention are set forth in the dependent claims.

According to a first aspect of the present invention, there is provided a method of managing memory in an electronic device, the method comprising creating a set of equally sized logical regions in a logical address space, each logical region comprising a plurality of consecutive logical addresses, and mapping a subset of consecutive logical addresses within each logical region to a set of physical addresses within a corresponding physical memory region, the subset of consecutive logical addresses comprising the first logical address within the logical region, said first logical address being mapped to a base address within the corresponding physical memory region.

The first aspect is based on the idea that equally sized logical regions are mapped to corresponding physical memory regions of individual size in such a way that a physical address (i.e. a physical memory address within a physical memory region) that corresponds to any given logical address can be identified and accessed with a minimum of operations. More specifically, due to the equal size of all logical regions, it is very easy to determine which logical region a given logical address belongs to. Furthermore, since the first logical address within a logical region is always mapped to a physical base address within the corresponding physical memory region, the physical address can be determined by adding an offset value corresponding to the offset from the first logical address within the logical region to the corresponding physical base address. Thus, different from other techniques of memory management, which usually require a large number of comparators, the method according to this aspect of the present invention allows for a very effective access to memory with a minimum of hardware and power consumption.

According to an embodiment, the method further comprises creating a permission mapping associating permission types to each logical region and to each execution context of a plurality of execution contexts.

The permission mapping allows for determination of whether a logical region (and thereby the corresponding physical memory region) is accessible to a certain execution context. In other words, some execution contexts have access to some particular memory regions and not to others. This is an essential functionality in a virtualization system.

According to a further embodiment, each execution context of the plurality of execution contexts corresponds to one of a plurality of operating systems.

According to a further embodiment, the step of creating the permission mapping comprises creating a first permission table indicating for each logical region whether or not the logical region is accessible to each of the plurality of execution contexts, the first permission table further indicating a region type for each logical region, and creating a second permission table indicating for each region type whether each of a plurality of permission types is given or not.

In other words, the first table contains for each logical region an indication of those execution contexts having access to the logical region as well as an indication of those execution contexts that do not have access to the logical region. Furthermore, the first permission table indicates a region type for each logical region. The region type may in particular be used to specify certain types of access permissions to the logical region.

According to a further embodiment, the plurality of permission types comprises a read permission, a write permission, an execute permission, and a privileged permission.

According to a second aspect of the present invention, there is provided a controller for managing memory in an electronic device, the controller comprising a memory and a processing unit. The memory comprises a set of equally sized logical regions in a logical address space, each logical region comprising a plurality of consecutive logical addresses, and a mapping of a subset of consecutive logical addresses within each logical region to a set of physical addresses within a corresponding physical memory region, the subset of consecutive logical addresses comprising the first logical address within the logical region, said first logical address being mapped to a base address within the corresponding physical memory region. The processing unit is operable to access the memory and adapted to determine a physical address corresponding to any logical address based on the logical regions and the mapping.

The second aspect is based on essentially the same idea as the first aspect discussed above. More specifically, the second aspect relates to a controller utilizing the mappings and structures provided by the method according to the first aspect to determine a physical address corresponding to any logical address.

The controller comprises memory and a processing unit. The controller may be a separate unit or an integrated part of other hardware in the electronic device. It should be emphasized that the logical address space does not take up a significant amount of memory. In particular, the logical address space may be stored in a compact manner, e.g. as data indicating the number of logical regions, the (uniform) size of the logical regions and the first logical address of the first logical region. These values make it possible to determine the logical address corresponding to any other logical region.

According to a further exemplary embodiment, the processing unit is adapted to determine the physical address by identifying the logical region containing the logical address, determining an offset for the logical address relative to the first logical address within the identified logical region, identifying the base address within the corresponding physical memory region, and determining the physical address by adding the identified base address and the determined offset.

The logical region containing the logical address can, due to the equal size of all logical regions, generally be determined by dividing the logical address with the region size. The offset is determined as the distance (i.e. difference) between the logical address and the first logical address within the identified logical region. The base address within the corresponding physical memory region is identified by means of the mapping.

According to a further exemplary embodiment, the memory further comprises a permission mapping associating permission types to each logical region and one or more execution contexts of a plurality of execution contexts, and the processing unit is further adapted to determine permission types for a selected logical region and a selected execution context.

The permission mapping allows the processing unit to determine whether a logical region (and thereby the corresponding physical memory region) is accessible to a certain execution context. In other words, some execution contexts have access to some particular memory regions and not to others. This is an essential functionality in a virtualization system.

According to a further exemplary embodiment, each execution context of the plurality of execution contexts corresponds to one of a plurality of operating systems. Alternatively, or additionally, each execution context may be one process among a plurality of processes executed by a single operating system.

According to a further exemplary embodiment, the permission mapping comprises a first permission table indicating for each logical region whether or not the logical region is accessible to each of a plurality of execution contexts, the first permission table further indicating a region type for each logical region. The permission mapping further comprises a second permission table indicating for each region type whether each of a plurality of permission types is given or not, and the processing unit is further adapted to identify a region type corresponding to the selected logical region and to identify the permission types that are given for the identified region type.

In other words, the first table contains for each logical region an indication of those execution contexts having access to the logical region as well as an indication of those execution contexts that do not have access to the logical region. Furthermore, the first permission table indicates a region type for each logical region. The region type may in particular be used to specify certain types of access permissions to the logical region.

According to a further exemplary embodiment, the plurality of permission types comprises a read permission, a write permission, an execute permission, and a privileged permission.

According to a third aspect of the present invention, there is provided a method of determining a physical address in a physical memory region using a controller, the controller comprising a memory comprising a set of equally sized logical regions in a logical address space, each logical region comprising a plurality of consecutive logical addresses. The memory further comprising a mapping of a subset of consecutive logical addresses within each logical region to a set of physical addresses within a corresponding physical memory region, the subset of consecutive logical addresses comprising the first logical address within the logical region, said first logical address being mapped to a base address within the corresponding physical memory region. The method comprises receiving a logical address, identifying the logical region containing the logical address, determining an offset for the logical address relative to the first logical address within the identified logical region, identifying the base address within the corresponding physical memory region, and determining the physical address by adding the identified base address and the determined offset.

The third aspect is essentially based on the same idea as the first and second aspects discussed above. In particular, the third aspect relates to a method corresponding to the operation of the controller according to the second aspect.

According to an exemplary embodiment, the memory further comprises a permission mapping associating permission types to each logical region and to each execution context of a plurality of execution contexts, the method further comprising determining permission types for a selected logical region and a selected execution context.

The permission mapping allows for determination of whether a logical region (and thereby the corresponding physical memory region) is accessible to a certain execution context. In other words, some execution contexts have access to some particular memory regions and not to others. This is an essential functionality in a virtualization system.

According to a further exemplary embodiment, each execution context of the plurality of execution contexts corresponds to one of a plurality of operating systems.

According to a further exemplary embodiment, the permission mapping comprises a first permission table indicating for each logical region whether or not the logical region is accessible to each of a plurality of execution contexts, the first permission table further indicating a region type for each logical region. The permission mapping further comprises a second permission table indicating for each region type whether each of a plurality of permission types is given or not. The method further comprises identifying a region type corresponding to the selected logical region, and identifying the permission types that are given for the identified region type.

In other words, the first table contains for each logical region an indication of those execution contexts having access to the logical region as well as an indication of those execution contexts that do not have access to the logical region. Furthermore, the first permission table indicates a region type for each logical region. The region type may in particular be used to specify certain types of access permissions to the logical region.

According to a further exemplary embodiment, the plurality of permission types comprises a read permission, a write permission, an execute permission, and a privileged permission.

It should be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present invention will be apparent from the examples of embodiment to be described hereinafter and are explained with reference to the examples of embodiment. The invention will be described in more detail hereinafter with reference to examples of embodiment to which the invention is, however, not limited.

DETAILED DESCRIPTION

Figure 1:
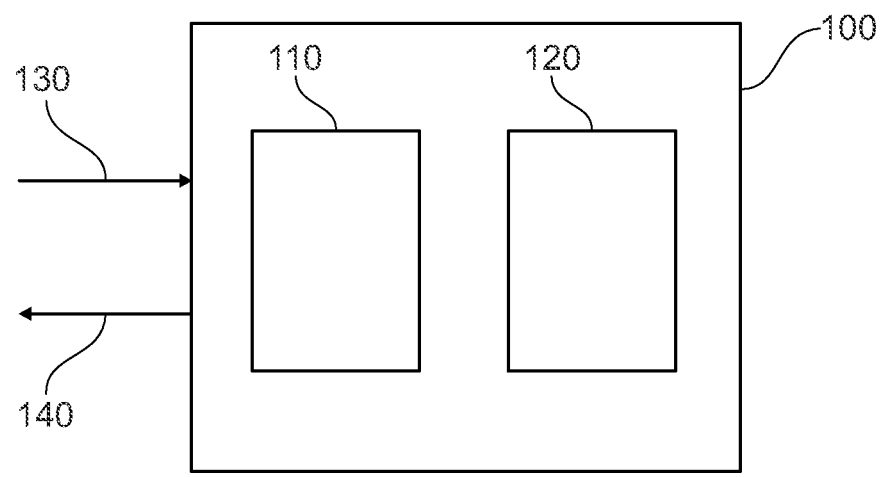
FIG. 1 shows a block diagram of a memory controller according to an exemplary embodiment.

The illustration in the drawing is schematic. It is noted that in different figures, similar or identical elements are provided with the same reference signs or with reference signs, which differ only within the first digit.

Figure 2:
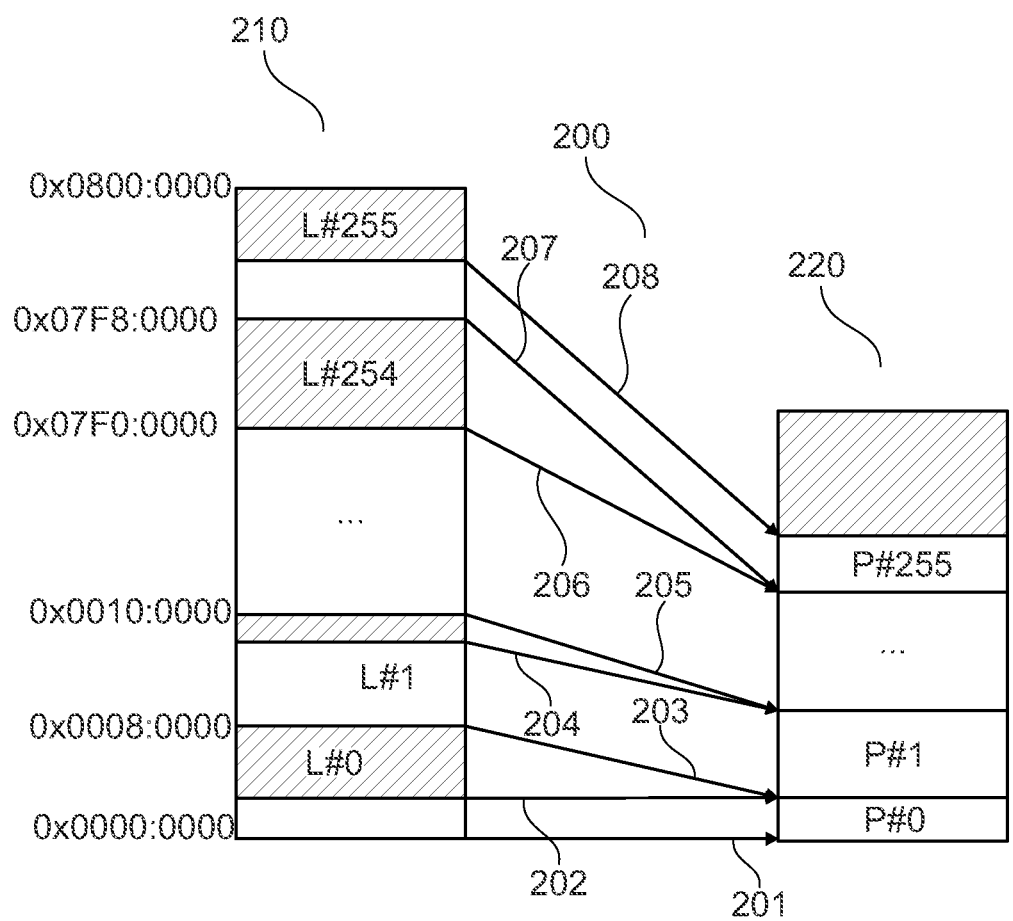
FIG. 2 illustrates a mapping between a logical address space and a physical memory in accordance with an exemplary embodiment.

FIG. 1 shows a block diagram of a memory controller 100 according to an exemplary embodiment. The controller 100 comprises a memory 110, a processing unit 120, an input 130, and an output 140. The memory 110 comprises data representing a set of equally sized logical regions in a logical address space, each logical region comprising a plurality of consecutive logical addresses. The memory 110 further comprises data representing a mapping of a subset of consecutive logical addresses within each logical region to a set of physical addresses within a corresponding physical memory region, the subset of consecutive logical addresses comprising the first logical address within the logical region, said first logical address being mapped to a base address within the corresponding physical memory region. An example of the data in memory 110 is shown in FIG. 2 and will be discussed in further detail below. The processing unit is operable to access the memory (110) and is furthermore adapted to determine a physical address corresponding to any logical address based on the logical regions and the mapping. The logical address is received at the input 130 and the determined physical address is output at output 140, preferably together with relevant permission data as will be discussed further below.

FIG. 2 illustrates a mapping 200 between a logical address space 210 and a physical memory 220 in accordance with an exemplary embodiment. In this exemplary embodiment, the logical address space 210 comprises a set of equally sized logical regions L #0, L #1, . . . , L #254, L #255. Furthermore, the size of each logical region is 512 KB in this example. As the skilled person will readily appreciate, any number of regions and any region size is possible.

Thus, in customary hexadecimal notation, the first logical address of logical region L #0 is 0x0000:0000, the first logical address of logical region L #1 is 0x0008:0000, and so forth. A subset (containing the first logical address) of each logical region is mapped to a corresponding physical memory region P #0, P #1, . . . P #255. The size of each physical region thus corresponds to the size of the subset and may thus vary between 0 (zero) and 512 KB. The parts of the logical regions, which are not included in the subsets, are hatched or shaded in FIG. 2. The mapping 200 contains respective links between the first logical address within each logical region and a base address within the corresponding physical memory region. More specifically, the link between the first logical address of L #0, i.e. 0x0000:0000, and the base address of physical memory region P #0 is represented by arrow 201, the link between the first logical address of L #1, i.e. 0x0008:0000, and the base address of physical memory region P #1 is represented by arrow 203, and the link between the first logical address of the next logical region (L #2, not shown), i.e. 0x0010:0000, and the base address of the corresponding physical memory region (P #2, not shown) is represented by arrow 205. In the example of FIG. 2, logical region L ##254 is empty and therefore both arrows 206 and 207 point to the same physical memory address, namely the base address of physical memory region P #255. The arrows 202, 204 and 208 respectively illustrate corresponding links between the last logical addresses in logical regions L #0, L #1 and L #255 and the last physical addresses in physical memory regions P #0, P #1 and P #255.

Returning to FIG. 1, the processing unit 120 is adapted to determine the physical address corresponding to a logical address received at input 130 by identifying the logical region containing the logical address, determining an offset for the logical address relative to the first logical address within the identified logical region, identifying the base address within the corresponding physical memory region, and determining the physical address by adding the identified base address and the determined offset. Thus, referring again to the example shown in FIG. 2, if the logical address 0x000A:0000 is received at input 130, then the processing unit determines (by dividing with the size of the logical regions) that this address lies within the logical region L #1 and has an offset relative to the first logical address 0x0008:0000 of this logical region that is equal to 2:0000 (i.e. 131072 in decimal). Then, upon identifying the base address within corresponding physical memory region P #1, the physical memory address corresponding to the received logical address is determined by adding the offset to the base address.

Summarizing the above, the physical memory (for example Flash or RAM) is first split into a number of logical regions located at fixed logical addresses and separated by large unmapped gaps. For example, there can be 256 logical regions, each with a fixed size of 512 KB, and located at the following logical addresses:

logical region L #0: 0x0000:0000 to 0x0007:FFFF
logical region L #1: 0x0008:0000 to 0x000F:FFFF
. . .
logical region L #254: 0x07F0:0000 to 0x07F7:FFFF
logical region L #255: 0x07F8:0000 to 0x07FF:FFFF Each region can point to real physical memory at the start of the region and the rest of the region being unmapped. For example, if the mapping granularity is equal to 0.5 KB, then the physical region P #0 can then be configured to contain 100.5 KB out of the 512 KB total logical size, the physical region P #1, 23.5 KB, etc. The granularity can depend on the memory type (e.g., 16 bytes for RAM and 512 bytes for Flash).

The controller hardware 100 "compresses" the logical addresses into physical addresses that fit into the actual physical memory, as shown in the example of FIG. 2 and discussed above. Generally, the low order bits of the logical addresses, e.g. bits 0 to 18 in FIG. 2, are used to check that an access is made within the range of physical addresses allocated to that region, while the high order bits, e.g. bits 19 and above in FIG. 2, are used to determined which region to access. In other words, the size of the individual physical regions or physical address ranges, e.g. P #0, P #1, P #255 in FIG. 2, which the logical addresses map to, are defined in the lower bits (bits 0 to 18 in FIG. 2).

The controller 100 makes use of an auxiliary RAM or registers containing the base physical addresses of each of the 256 logical regions. The controller applies the following formula to determine the physical address from the logical address:

region_number=logical_address[26:19]
offset_in_region=logical_address[18:0]
physical_address=base_address[region_number]+offset_in_region The logical regions provide at least the following two advantages:

Each region can be resized and populated independently of the other regions by just shifting the memory content and updating the value of each displacement above the region being resized. While this is a relatively heavy operation, in the typical secure element operating systems, it happens rarely, for example only during application installation or system updates. Furthermore, resizing a region does not change the logical address of existing content of the other regions, which is useful for independent update of an OS or of part of an OS.

The logical address space is very regular, which simplifies the permission system: it is indeed very fast in hardware to determine which is the region of a logical address and apply uniform permissions per region. This is to be compared to systems where the address space is more "compact" (no gaps), where fine-grained address comparators are needed, for example to achieve 32-byte granularity. This requires a lot of hardware resources, consumes more power, and will therefore always have a limited number of permission regions.

Figure 3:
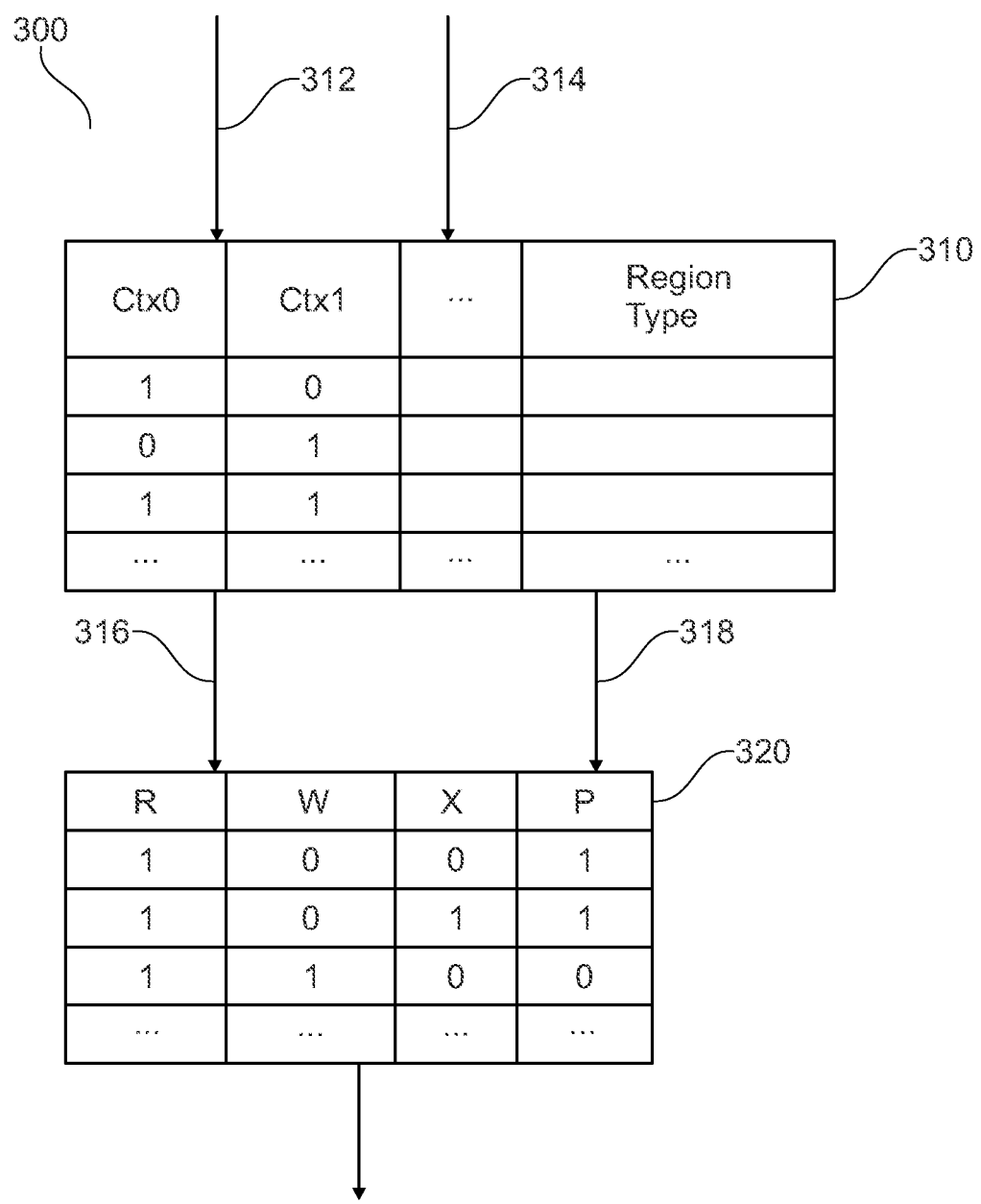
FIG. 3 illustrates a permission mapping comprising two tables in accordance with an exemplary embodiment.

The memory 110 of controller 100 may further comprise a permission mapping indicating whether each logical region is accessible to one or more of a plurality of execution contexts, in particular operating systems (OSs) and the processing unit 120 may further be adapted to determine whether a selected logical region is accessible for a selected execution context. FIG. 3 illustrates an exemplary permission mapping comprising two tables 310, 320 in accordance with such an exemplary embodiment. The first table 310 contains one entry or line for each region with indications of whether or not the corresponding region is accessible for each of the execution contexts Ctx0, Ctx1, . . . , as well as an indication of a region type. The second table 320 contains one line or entry for each region type with indications of whether or not the corresponding region type has a read permission R, a write permission W, an execute permission X, and a privileged permission P. In operation, the controller 100 uses the two tables 310, 320 as follows: For any current context of execution (as represented by arrow 312) and logical address to be checked (as represented by arrow 314), the first table 310 is used to determine whether access is allowed 1 or not allowed 0 for the current context of execution. The result us output at 316. Furthermore, the corresponding region type is identified and output at 318. Then, using the second table 320, the permission types corresponding to the identified region type are identified, i.e. it is determined whether each of a read permission R, a write permission W, an execute permission X, and a privileged permission P are given or not. The result may be output as a four-bit vector at 322. If access is denied in the first table, the vector may have the value 0000.

As shown above, the permission system makes use of two levels of permission tables 310, 320 to allow fast context switches between OSs with limited resource consumption:

A first-level table (TABLE1 310) provides for each region:
  Whether the region is accessible to a set of "execution contexts", for example one context per OS
    A small token called the "region type". For example, the region type can be encoded on 5 bits, which allows up to 32 different region types
A second-level table (TABLE2 320) provides four permission bits per region type (Read, Write, eXecute, Privileged).

The described permission system has several advantages, including:
  The first table 310 (TABLE1) is relatively big (about 16 bits per region, i.e., 512 bytes for 256 regions) but only a single copy of the table is necessary because the overall access to the logical regions is static and may be changed only when the system configuration is updated
  The second table 320 (TABLE2) is compact (32×4 bits=4 words), which allows a fast context-switch between OSs: the hypervisor must just reload these four words to context-switch the entire memory view of an OS
  Fine-grained permissions can be assigned per region type only, not per region, but there are still a relative high number of region types and they allow grouping multiple regions that share the same permissions. For example, all the code regions of an OS can share the same region type and still be separated in the logical address space, which allows separate updates of these parts
  TABLE1 310 allows a region to be accessible to a single context or to multiple contexts, thus supporting private and shared regions Furthermore, the described system is suitable for fast hardware implementation because:
  TABLE2 320 is very small and can thus be implemented entirely in fast flip-flop registers
  An extract of TABLE1 310 can be kept in a fast cache (Translation Lookaside Buffer). This cache needs to be invalidated only when TABLE1 310 changes. When TABLE2 320 is loaded, the content of the cache is still valid
  Thanks to the logical region address system, the region number can be determined very quickly by extracting a few bits from the logical address (bits 26:19, for example).

The initial motivation for embodiments of the present invention was to setup a system with two operating systems in a single device running a single processor core: (1) a Secure Element OS, taking care of payment, transport, and device security applications; and (2) a UICC OS, implementing the operations on behalf of a Mobile Network Operator.

The virtualization system allows separate certifications of these two OSes and separate updates of them.

Another motivation of the virtualization system is to isolate the implementation of the communication protocols in an OS that is separate from the main OS's. This is expected to simplify the certification of the JCOP OS as the communication protocol stacks would not need to be certified at the same level as the main JCOP OS.

Another application of the system is to be able to host a third-party native OS alongside JCOP. This third-party OS would be able to run in Privileged mode, handle interrupts and interact with peripherals, under the control of the hypervisor.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also, elements described in association with different embodiments may be combined. It should also be noted that reference signs in the claims should not be construed as limiting the scope of the claims.

The invention claimed is:

1. A method of managing memory in an electronic device, the method comprising
  creating a set of equally sized logical regions in a logical address space, each logical region comprising a plurality of consecutive logical addresses, and
  mapping a subset of consecutive logical addresses within each logical region to a set of physical addresses within a corresponding physical memory region, wherein logical regions of the equally sized logical regions are separated from each other by unmapped gaps, the subset of consecutive logical addresses comprising a first logical address within the logical region, said first logical address being mapped to a base address within the corresponding physical memory region.

2. The method according to claim 1, further comprising
  creating a permission mapping associating a permission type to each logical region and to each execution context of a plurality of execution contexts.

3. The method according to claim 2, wherein each execution context of the plurality of execution contexts corresponds to one of a plurality of operating systems.

4. The method according to claim 2, wherein creating the permission mapping comprises
  creating a first permission table indicating for each logical region whether or not the logical region is accessible to each of the plurality of execution contexts, the first permission table further indicating a region type for each logical region, and
  creating a second permission table indicating for each region type whether each of a plurality of permission types is given or not.

5. The method according to claim 4, wherein the plurality of permission types comprises a read permission, a write permission, an execute permission, and a privileged permission.

6. A method of determining a physical address in a physical memory region using a controller, the controller comprising a memory comprising a set of equally sized logical regions in a logical address space, each logical region comprising a plurality of consecutive logical addresses, and a mapping of a subset of consecutive logical addresses within each logical region to a set of physical addresses within a corresponding physical memory region, the subset of consecutive logical addresses comprising the first logical address within the logical region, said first logical address being mapped to a base address within the corresponding physical memory region, the method comprising
  receiving a logical address,
  identifying the logical region containing the logical address,
  determining an offset for the logical address relative to the first logical address within the identified logical region,
  identifying the base address within the corresponding physical memory region, and
  determining the physical address by adding the identified base address and the determined offset, wherein logical regions of the equally sized logical regions are separated from each other by unmapped gaps.

7. The method according to claim 6, wherein the memory further comprises a permission mapping associating permission types to each logical region and to each execution context of a plurality of execution contexts, the method further comprising
determining permission types for a selected logical region and a selected execution context.

8. The method according to claim 7, wherein each execution context of the plurality of execution contexts corresponds to one of a plurality of operating systems.

9. The method according to claim 7, wherein the permission mapping comprises
a first permission table indicating for each logical region whether or not the logical region is accessible to each of a plurality of execution contexts, the first permission table further indicating a region type for each logical region, and
a second permission table indicating for each region type whether each of a plurality of permission types is given or not,
the method further comprising
identifying a region type corresponding to the selected logical region, and
identifying the permission types that are given for the identified region type.

10. A controller for managing memory in an electronic device, the controller comprising
a memory comprising
a set of equally sized logical regions in a logical address space, each logical region comprising a plurality of consecutive logical addresses, and
a mapping of a subset of consecutive logical addresses within each logical region to a set of physical addresses within a corresponding physical memory region, wherein logical regions of the equally sized logical regions are separated from each other by unmapped gaps, the subset of consecutive logical addresses comprising a first logical address within the logical region, said first logical address being mapped to a base address within the corresponding physical memory region, and
a processing unit operable to access the memory and adapted to determine a physical address corresponding to any logical address based on the logical regions and the mapping.

11. The controller according to claim 10, wherein the processing unit is adapted to determine the physical address by
identifying the logical region containing the logical address,
determining an offset for the logical address relative to the first logical address within the identified logical region,
identifying the base address within the corresponding physical memory region, and
determining the physical address by adding the identified base address and the determined offset.

12. The controller according to claim 10,
wherein the memory further comprises a permission mapping associating permission types to each logical region and to each execution context of a plurality of execution contexts, and
wherein the processing unit is further adapted to determine permission types for a selected logical region and a selected execution context.

13. The controller according to claim 12, wherein each execution context of the plurality of execution contexts corresponds to one of a plurality of operating systems.

14. The controller according to claim 12,
wherein the permission mapping comprises
a first permission table indicating for each logical region whether or not the logical region is accessible to each of a plurality of execution contexts, the first permission table further indicating a region type for each logical region, and
a second permission table indicating for each region type whether each of a plurality of permission types is given or not, and
wherein the processing unit is further adapted to identify a region type corresponding to the selected logical region and to identify the permission types that are given for the identified region type.

15. The controller according to claim 14, wherein the plurality of permission types comprises a read permission, a write permission, an execute permission, and a privileged permission.

* * * * *